Patented Apr. 21, 1925.

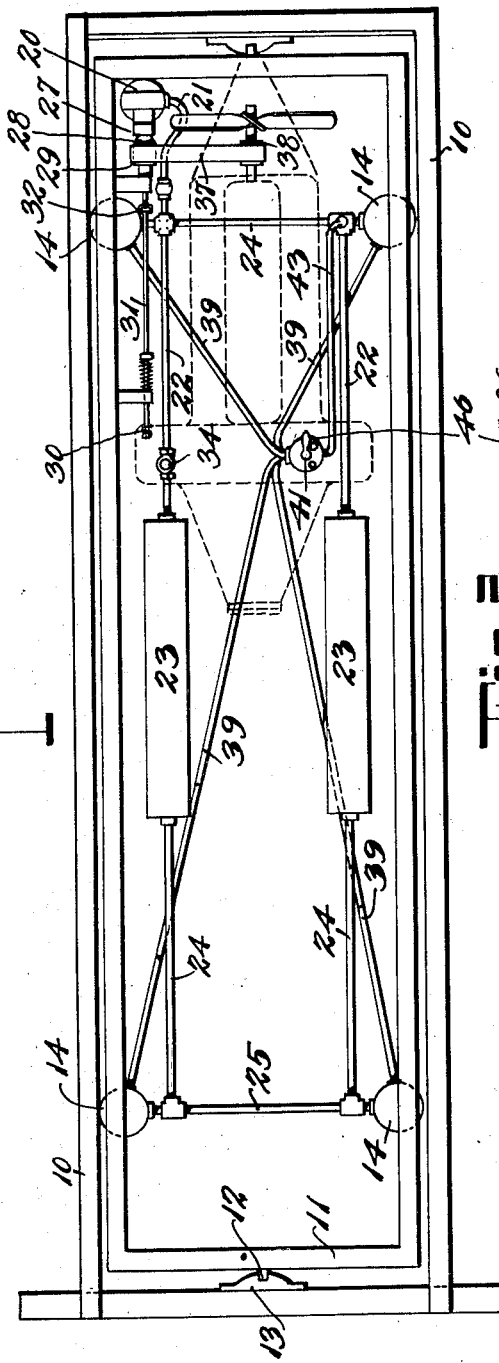

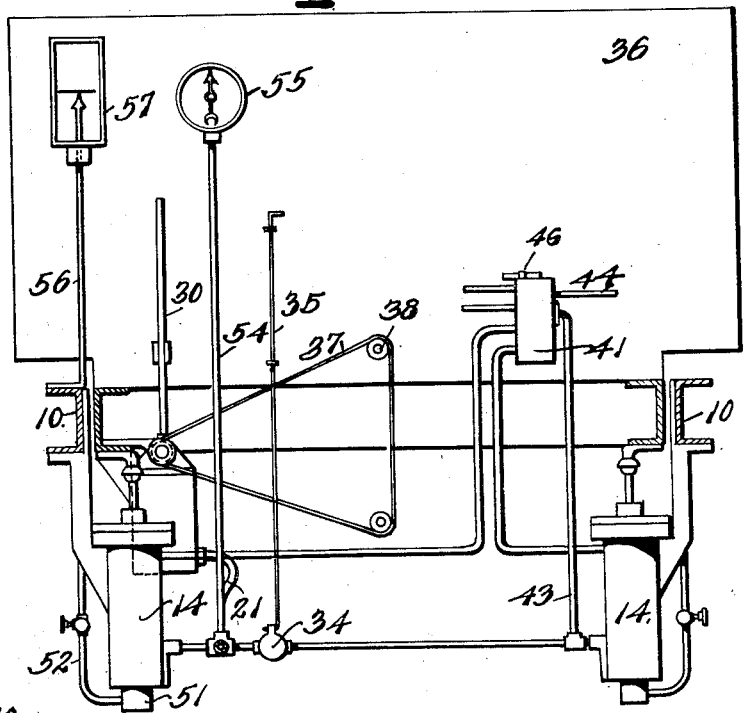

1,534,839

UNITED STATES PATENT OFFICE.

JAMES MADISON BURNAP, OF DENVER, COLORADO.

FLUID-PRESSURE CUSHIONING MECHANISM FOR VEHICLES.

Application filed July 11, 1923. Serial No. 650,910.

*To all whom it may concern:*

Be it known that I, JAMES MADISON BURNAP, a citizen of the United States, residing at Denver, in the county of Denver and State of Colorado, have invented certain new and useful Improvements in Fluid-Pressure Cushioning Mechanism for Vehicles, of which the following is a specification.

This invention relates to a fluid pressure cushioning mechanism for vehicles, particularly to a structure wherein the body is yieldingly supported by a regulated fluid medium.

In previous constructions having such objects in view the pressure of the supporting fluid has not been so regulated as to effectively control the vertical movement of the body in opposite directions to secure both a cushioning and shock absorbing action between the parts and the variation of such pressure while the vehicle is in motion contingent upon conditions of load or road.

The present invention has for an object to provide a novel and improved construction of cylinder and piston connection between a relatively movable frame and body portion, with means for independently introducing and controlling fluid pressures at opposite sides of such piston.

A further object of the invention is to present a novel structure of cylinder having pressure inlets at its opposite ends and an intermediate piston, and also means for restoring a sealing liquid from one side of the piston to the other.

Another object of the invention is to provide an improved construction of regulating means by which the pressures at opposite site faces of the piston may be determined, together with indicating mechanism accessible to the operator for clearly disclosing the pressure conditions in the system.

Other and further objects of the invention will be hereinafter set forth and the novel features thereof defined by the appended claims.

In the drawings:—

Figure 1 is a plan of the invention applied;

Figure 2 is a side elevation thereof;

Figure 3 is a vertical section upon an enlarged scale;

Figure 4 is a similar view through one of the cushioning cylinders and its connections;

Figure 5 is a detailed section through the pressure pump connection;

Figure 6 is a detail section through the regulating valve for the pressure lines to the upper portions of the cylinders; and Figure 7 is a plan of this member.

Like numerals refer to like parts throughout the several figures of the drawing.

The invention is designed for application to any desired form of vehicle and is especially adapted for use in connection with an automobile structure. In the form thereof herein shown the numeral 10 designates a rectangular or other shape of outer frame comprising a portion of the chassis of the machine. Disposed within this frame is an inner frame 11 carrying the body portion and driving mechanism. These two frames are suitably guided in their relative vertical movement by means of the rib 12 upon the inner frame riding in a channel block 13 of the outer frame, as shown in Figures 1 and 2, but the form of this connection may be varied at will. The inner and outer frames are connected and supported from each other by cylinder members 14 and cooperating pistons 15 therein, the rods 16 of which are connected with the inner frame by universal joints 17 at their upper ends to permit necessary movement of the parts. Any desired number of these cylinder and piston connections may be used, four being herein shown, and the cylinder may be supported in any preferred manner, for instance by means of a hanger 18 depending from the outer frame as shown in Figures 3 and 4.

Any desired form of fluid pressure generator and connections may be used but a preferred construction is herein disclosed which comprises a pump member 20 from which a pressure line 21 extends to parallel connecting pipes 22 which communicate with expansion cylinders 23. A cross line 24 connects the two forward cylinders 14 with the lines 21 and 22. For the purpose of conducting pressure to the rear cylinders lines 24 are provided and extend from the expansion tanks to a communicating cross pipe 25 disposed at the lower portion of the cylinders 14. The use of the expansion chambers 23 provides a uniform pressure and affords greater resiliency to the air or fluid pressure so that it is maintained at a constant point in the respective cylinders and not directly influenced by the pumping action.

The pump member being mounted upon the inner frame is capable of movement in the yielding motion of this frame, and for that purpose the connection 21 from the pump is preferably of a flexible character.

The pump may be driven by any desired connection with the power plant of the vehicle, one form being shown in which a crank shaft 26 is mounted in the pump casing and carries a clutch member 27 which co-operates with a clutch 28 slidingly mounted for movement relative thereto and provided with a driving pulley 29. The clutch member 28 is shifted by means of the lever 30 which is connected by a rod 31 and a rotary joint 32 with the shaft 33 of the clutch member, as shown in Figure 5.

The pressure from the pump to the expansion cylinders and lines leading therefrom may be regulated to the desired degree by means of the release valve 34 disposed in the line 22 and having an operating rod 35 extended to a convenient position upon the dash board 36 of the vehicle. The pump may be driven by means of a belt 37 extending over the pulley 29 and receiving power from the fan shaft 38.

The parts so far described have provided for fluid pressure beneath the pistons 15 in the cylinders but it is also desirable to control the rebound action and perform a shock absorbing function by introducing pressure at the upper face of the pistons, and this is accomplished by means of a series of conducting pipes 39 communicating with the upper portion of the cylinders and extending to a controlling valve 40 disposed in a casing 41. This casing is provided with a chamber 42 with which all of the pipes 39 communicate, and at its opposite side a feed pipe 43 is connected from the pressure in the lines 22 as shown in Figure 1. The casing is also provided with an exhaust connection 44 and the valve member has a segment thereof removed, comprising a cross port 45 which in the position shown in Figure 6 provides for pressure from the pipe 43 to the chamber 42 and all of the conducting pipes 39, thus establishing an equal pressure upon the upper face of all of the pistons. The valve is provided with an operating handle 46 which cooperates with stops 47 and 48. When in contact with the latter stop the port 45 is shifted in position so that the pressure inlet is closed and the chamber 42 communicates with the exhaust pipe 44 to reduce the pressure at the upper portion of the cylinders to the desired extent.

The cylinders are also provided above the pistons with a body of liquid 49, such as lubricating oil, which insures the lubrication of the pistons in their movement. During such action this oil escapes to different extents to the lower portion of the cylinder and there passes through a drain screen 50 into a pocket 51 from which a return pipe 52 extends to the upper portion of the cylinder and is provided with a controlling valve 53. When it is desired to restore the oil collected in the pocket to the upper portion of the cylinder this valve is opened when the car is at rest and the greater pressure below the piston forces the oil to its original position above the piston.

The pressure present in the system is the same for both ends of the cylinders and an indication thereof may be secured by means of the connecting pipe 54 carrying a gauge 55 disposed at the dash-board 36. It is also desirable to indicate the extent of depression of the body owing to different conditions for determining the level thereof, and this is indicated by means of the rod 56 carried by the frame 10 and extending through an indicating frame 57 upon the dash-board which is movable with the inner frame 11.

The operation of the invention will be apparent from the foregoing description from which it will be seen that the body of the vehicle and the power plant carried thereby are yieldingly supported by the fluid medium at opposite sides of the piston so that the downward movement is cushioned and the upward or restoring movement similarly resisted to prevent rebound and secure a shock absorbing result. The construction also provides for regulating the cylinder pressures under running conditions so that the vehicle may be quickly adapted to different conditions of load or road bed and thus secure the most desirable riding qualities and avoid danger of spring breakage or other injury incident to rough road conditions. This regulation is independently effected for the pressures above and below the pistons so that the action thereof may be correspondingly determined. Means are provided for properly lubricating the cylinders under all conditions and for supplying fluid pressure from the power plant of the motor vehicle.

The invention presents a simple, efficient and economically constructed system for cushioning the movement of a vehicle body relative to its chassis or frame and while the details thereof have been specifically shown and described, the invention is not confined thereto as changes and alterations may be made without departing from the spirit of the invention as defined by the following claims.

Having thus described my invention, what I claim as new and desire to secure by Letters Patent is:—

1. In a cushioning mechanism, a wheel support, a body support, a plurality of cylinders carried by one support, a plurality of plungers carried by the other support and disposed in said cylinders, a fluid pressure supply, pipe lines leading therefrom to the lower portion of the respective cylinders, manually controlled means for releasing pressure from said lines, independent pipe lines connected to the upper portion of said cylinders, and a unitary means for simultaneously controlling the pressure of said independent lines.

2. In a cushioning mechanism, an outer frame, an inner frame, a cylinder carried beneath the outer frame, a piston therein having its rod connected to the inner frame, a pump mechanism carried by the inner frame, a flexible connection therefrom with the lower portion of said cylinder, and an independent connection from said pump with the upper portion of said cylinder.

3. In a cushioning mechanism, an outer frame, an inner frame, a cylinder carried beneath the outer frame, a piston therein having its rod connected to the inner frame, a pump mechanism carried by the inner frame, a flexible connection therefrom with the lower portion of said cylinder, an independent connection from said pump with the upper portion of said cylinder, a discharge valve connected with the lower intake to the cylinder to regulate the pressure beneath the piston therein, and a regulating valve controlling the intake to the upper portion of said cylinder to control the pressure at that point relative to the pressure beneath the piston.

4. In a cushioning mechanism, an outer frame, a frame disposed therein and carrying a power unit, a plurality of cylinders carried by the outer frame, a plurality of plungers carried by the inner frame and disposed in said cylinders, a pump mechanism connected for actuation from the power unit, pipe lines leading therefrom to the lower portion of the respective cylinders, and independent pipe lines connected to the first mentioned lines and leading to the upper portion of said cylinders.

5. In a cushioning mechanism, an outer frame, a frame disposed therein and carrying a power unit, a plurality of cylinders carried by the outer frame, a plurality of plungers carried by the inner frame and disposed in said cylinders, a pump mechanism connected for actuation from the power unit, pipe lines leading therefrom to the lower portion of the respective cylinders, independent pipe lines connected to the first mentioned lines and leading to the upper portion of said cylinders, and a controlling valve for all of said last mentioned upper pipe lines.

6. In a cushioning mechanism, relatively movable supports, a cylinder and piston connection between said supports, means for introducing fluid pressure in said cylinder beneath said piston, a pocket at the lower portion of the cylinder to receive a lubricating medium therein, a connection from said pocket to the upper portion of said cylinder, and means in said connection for controlling the flow through said connection to prevent pressure communication between the ends of the cylinder.

7. In a cushioning mechanism, relatively movable frames, a cylinder and piston connection between said frames, a pressure reservoir means for introducing fluid pressure therefrom to the lower portion of said cylinder, independent means for introducing such pressure to the upper portion of the cylinder, a valve controlling the last mentioned means, a casing for said valve having a chamber for the pipe line connections to opposite ends of the cylinder, and intake and exhaust connections with said casing and valve therein.

8. In a cushioning mechanism, a wheeled support, a body support carrying a power unit, a plurality of cylinders carried by one support, a plurality of plungers carried by the other support and disposed in said cylinders, a pump mechanism connected for actuation from the power unit, pipe lines leading therefrom to the lower portion of the respective cylinders, and independent pipe lines connected to the first mentioned lines and leading to the upper portion of said cylinders.

In testimony whereof I affix my signature.

JAMES MADISON BURNAP.